(12) United States Patent
Ponnusamy et al.

(10) Patent No.: US 10,067,771 B2
(45) Date of Patent: Sep. 4, 2018

(54) SYSTEMS AND METHODS FOR CONFIGURING BOOTABLE NETWORK TARGET FOR BOOT IN A SINGLE REBOOT

(71) Applicant: Dell Products L.P., Round Rock, TX (US)

(72) Inventors: Vigneswaran Ponnusamy, Round Rock, TX (US); Raja Tamilarasan, Santa Clara, CA (US); Yogesh Prabhakar Kulkarni, Round Rock, TX (US); Mark W. Shutt, Austin, TX (US); Sundar Dasar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/018,301

(22) Filed: Feb. 8, 2016

(65) Prior Publication Data

US 2017/0228237 A1    Aug. 10, 2017

(51) Int. Cl.
*G06F 1/00* (2006.01)
*G06F 9/4401* (2018.01)

(52) U.S. Cl.
CPC .................. *G06F 9/4416* (2013.01)

(58) Field of Classification Search
CPC .................. G06F 9/4416; G06F 11/0709
See application file for complete search history.

(56) References Cited

U.S. PATENT DOCUMENTS

| | | | |
|---|---|---|---|
| 2011/0179261 A1* | 7/2011 | Tachibana | G06F 9/4416 713/2 |
| 2015/0143094 A1 | 5/2015 | Rose et al. | |
| 2015/0143170 A1* | 5/2015 | Andrews | G06F 11/1435 714/15 |
| 2015/0301880 A1* | 10/2015 | Allu | G06F 11/0709 714/4.3 |

* cited by examiner

*Primary Examiner* — Austin Hicks
(74) *Attorney, Agent, or Firm* — Jackson Walker L.L.P.

(57) ABSTRACT

In accordance with these and other embodiments of the present disclosure, a method may include receiving at a management controller of an information handling system a request for remote boot of the information handling system from a remote target communicatively coupled to a network interface of a host system comprising the network interface and a host system processor communicatively coupled to the network interface and the management controller, configuring the network interface for remote boot via the network interface, and issuing an instruction to reboot the host system, wherein receipt of the request for remote boot, configuration of the network interface for remote boot, and issuance of the instruction to reboot the host system are performed without an intervening boot of the host system.

20 Claims, 2 Drawing Sheets

SYSTEMS AND METHODS FOR CONFIGURING BOOTABLE NETWORK TARGET FOR BOOT IN A SINGLE REBOOT

TECHNICAL FIELD

The present disclosure relates in general to information handling systems, and more particularly to methods and systems for enabling a remotely configurable bootable network target in a manner requiring only a single reboot.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In typical deployments of information handling systems, a requirement of an information handling system to boot to a network target requires some pre-configuration. Remote methods typically involve enabling a configuration to boot to a network target, and then modifying the boot order in a basic input/output system (BIOS) to render the target bootable on a subsequent boot. For a remote administrator, these steps may be time consuming, particularly if the remote administrator must configure numerous information handling systems. In addition, many current approaches for configuring boot from a network target require multiple reboots of an information handling system.

SUMMARY

In accordance with the teachings of the present disclosure, the disadvantages and problems associated with existing approaches for configuring an information handling system for boot to a network target may be reduced or eliminated.

In accordance with embodiments of the present disclosure, an information handling system may include a host system and a management controller. The host system may include a host system processor and a network interface communicatively coupled to the host system processor. The a management controller may be communicatively coupled to the host system processor and configured to provide management of the information handling system via management traffic communicated between the management controller and a network external to the information handling system, the management controller further configured to receive a request for remote boot of the information handling system from a remote target communicatively coupled to the network interface, configure the network interface for remote boot via the network interface, and issue an instruction to reboot the host system, wherein receipt of the request for remote boot, configuration of the network interface for remote boot, and issuance of the instruction to reboot the host system are performed without an intervening boot of the host system, wherein the host system is configured to boot from the remote target via the network interface responsive to receipt of the instruction to reboot the host system.

In accordance with these and other embodiments of the present disclosure, a method may include receiving at a management controller of an information handling system a request for remote boot of the information handling system from a remote target communicatively coupled to a network interface of a host system comprising the network interface and a host system processor communicatively coupled to the network interface and the management controller, configuring the network interface for remote boot via the network interface, and issuing an instruction to reboot the host system, wherein receipt of the request for remote boot, configuration of the network interface for remote boot, and issuance of the instruction to reboot the host system are performed without an intervening boot of the host system.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to receive at a management controller of an information handling system a request for remote boot of the information handling system from a remote target communicatively coupled to a network interface of a host system comprising the network interface and a host system processor communicatively coupled to the network interface and the management controller, configure the network interface for remote boot via the network interface, and issue an instruction to reboot the host system, wherein receipt of the request for remote boot, configuration of the network interface for remote boot, and issuance of the instruction to reboot the host system are performed without an intervening boot of the host system, wherein the host system is configured to boot from the remote target via the network interface responsive to receipt of the instruction to reboot the host system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
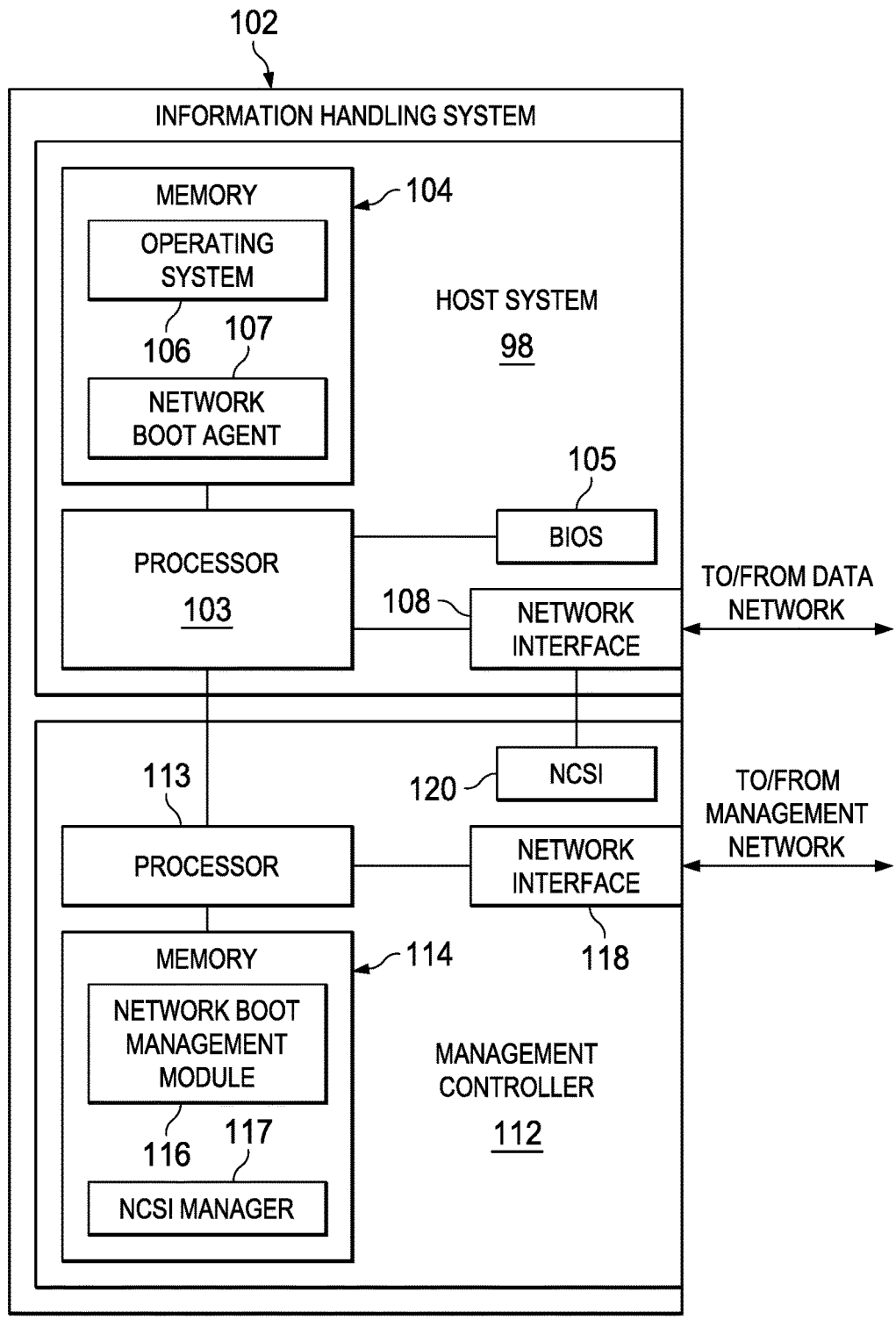
FIG. 1 illustrates a block diagram of an example information handling system, in accordance with embodiments of the present disclosure.
Figure 2:
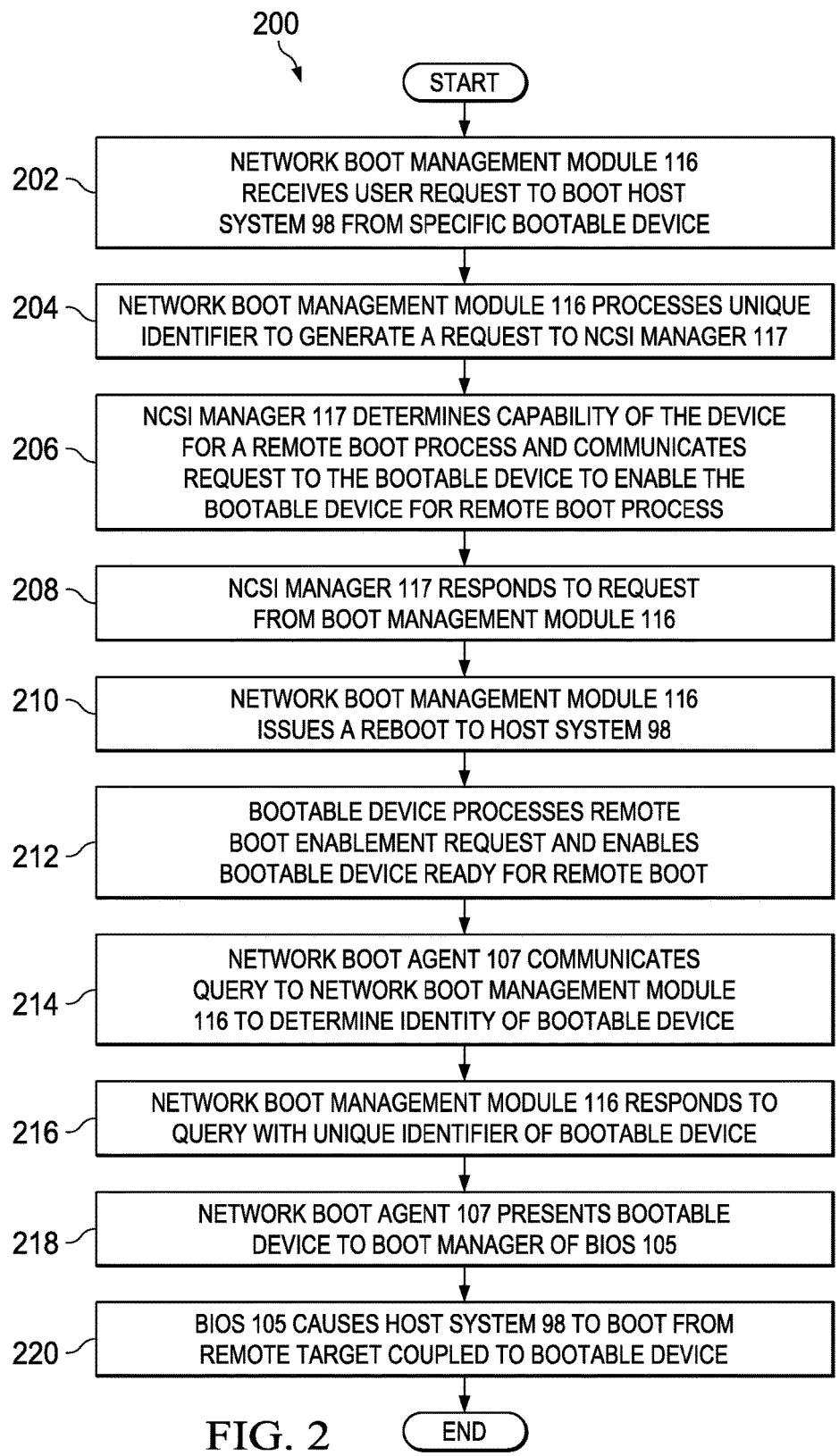
FIG. 2 illustrates a flowchart of an example method for configuring an information handling system to boot from a network target, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Also as shown in FIG. 1, memory 104 may have stored thereon a network boot agent 107. Network boot agent 107 may comprise any program of executable instructions, or aggregation of programs of executable instructions, configured to facilitate configuration of information handling system 102 for a boot from a network target via network interface 108. For example, as described in greater detail below, network boot agent 107 may be configured to, for a one-time boot or permanent first boot, present a bootable network device (e.g., network interface 108) to a boot manager of BIOS 105 during a boot process of information handling system 102, thus facilitating configuration and booting to a bootable network device in a single reboot.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI).

In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

Management controller 112 may be configured to provide management facilities for management of information handling system 102. Such management may be made by management controller 112 even if information handling system 102 is powered off or powered to a standby state. Management controller 112 may include a processor 113, memory 114, a management network interface 118 separate from and physically isolated from data network interface 108, and a Network Controller Sideband Interface (NCSI) 120. In certain embodiments, management controller 112 may include or may be an integral part of a baseboard management controller (BMC) or a remote access controller (e.g., a Dell Remote Access Controller or Integrated Dell Remote Access Controller).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

As shown in FIG. 1, memory 114 may have stored thereon a network boot management module 116 and an NCSI manager 117. Network boot management module 116 may comprise any program of executable instructions, or aggregation of programs of executable instructions, configured to receive management requests to boot host system 98 to a specific network device and process the request to facilitate configuration of network boot and the network boot in a single reboot, as described in greater detail below. Although network boot management module 116 is shown in FIG. 1 as stored in memory 114, in some embodiments network boot management module 116 may be stored in storage media accessible to processor 113, and active portions of network boot management module 116 may be transferred from such storage media to memory 114 for execution by processor 113.

NCSI manager 117 may comprise any program of executable instructions, or aggregation of programs of executable instructions, to manage NCSI 120. In particular, NCSI manager 117 may be configured to receive a request from network boot management module 116 to communicate with a network device (e.g., network interface 108) via a sideband interface (e.g., NCSI 120) in order to determine boot capability and/or enable network boot for the network device, in order to facilitate configuration of network boot and the network boot in a single reboot, as described in greater detail below. Although NCSI manager 117 is shown in FIG. 1 as stored in memory 114, in some embodiments NCSI manager 117 may be stored in storage media accessible to processor 113, and active portions of NCSI manager 117 may be transferred from such storage media to memory 114 for execution by processor 113.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface.

NCSI 120 may comprise an interface of management controller 112 which is separate from and physically isolated from network interface 118, and which is configured to receive data from and/or communicate data to host system network interface 108 of information handling system 102.

In addition to processor 103, memory 104, network interface 108, and management controller 112, information handling system 102 may include one or more other information handling resources.

FIG. 2 illustrates a flowchart of an example method 200 for configuring an information handling system to boot from a network target, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, network boot management module 116 may receive, via a management network coupled via network interface 118, a user request (e.g., from a remote management console) to boot host system 98 from a specific bootable device (e.g., network interface 108). In the request, the bootable device may be identified using any suitable unique identifier (e.g., a Fully Qualified Device Descriptor or FQDD).

At step 204, network boot management module 116 may process the unique identifier in order to generate a request to NCSI manager 117 to determine a presence of a device having the unique identifier.

At step 206, in response from the request from network boot management module 116, NCSI manager 117 may, via NCSI 120, determine capability of the device for a remote boot process (e.g., Windows Pre-boot Execution Environment (PXE), remote boot over Small Computer Systems Interface (SCSI)) and communicate a request to the bootable device to enable the bootable device for the remote boot process, if not already enabled.

At step 208, NCSI manager 117 may respond to the request from boot management module 116. At step 210, upon receiving the response, network boot management module 116 may issue a reboot to host system 98 (e.g., to processor 103).

At step 212, upon the reboot of host system 98, the configured and enabled bootable device (e.g., network interface 108) may process the remote boot enablement request and enable the bootable device ready for a remote boot.

At step 214, during host reboot, network boot agent 107 may communicate a query to network boot management module 116 to determine the bootable device. At step 216, network boot management module 116 may respond to the query with the unique identifier of the bootable device. At step 218, network boot agent 107 may present the bootable device to a boot manager of BIOS 105 for either of a one-time boot or a permanent first boot (e.g., based on a preference set forth in the administrator request), thus achieving configuration of network boot and boot to the bootable device in a single boot. At step 220, BIOS 105 may cause host system 98 to boot from a remote target coupled to the bootable device. After completion of step 220, method 200 may end.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a host system comprising:
      a host system processor; and
      a network interface communicatively coupled to the host system processor; and
   a management controller communicatively coupled to the host system processor and configured to provide management of the information handling system via management traffic communicated between the management controller and a network external to the information handling system, the management controller further configured to:
      while the host system is booted into an operating system, receive a request for network boot of the information handling system from a remote target communicatively coupled to the network interface;
      configure the network interface for network boot via the network interface, including communicating, via a sideband interface of the management controller, a request to the network interface to enable the network interface for a network boot process; and
      issue an instruction to reboot the host system, wherein receipt of the request for network boot, configuration of the network interface for network boot, and issuance of the instruction to reboot the host system are performed without an intervening boot of the host system;
   wherein the host system is configured to boot from the remote target via the network interface responsive to receipt of the instruction to reboot the host system.

2. The information handling system of claim 1, wherein the management controller is configured to receive the request for network boot of the information handling system via a second network interface integral to the management controller and having a communications interface physically isolated from the network interface.

3. The information handling system of claim 1, the management controller configured to configure the network interface for network boot via the network interface by:
   processing a unique identifier of the request for network boot of the information handling system; and
   responsive to processing the unique identifier, determining capability of the network interface for the network boot process and communicating the request to the network interface to enable the network interface for the network boot process.

4. The information handling system of claim 1, wherein the sideband interface is a Network Controller Sideband Interface (NCSI).

5. The information handling system of claim 1, wherein the network boot process comprises one of Windows Pre-boot Execution Environment and network boot via Small Computer System Interface.

6. The information handling system of claim 1, wherein the host system processor is configured to execute a network boot management module that, responsive to the instruction to reboot the host system, presents the network interface to a boot manager of a basic input/output system of the host system.

7. The information handling system of claim 6, wherein the network boot management module is configured to present the network interface to the boot manager by, during boot of the host system:
communicating a query to the network boot management module to determine a unique identifier of the network interface;
receiving the unique identifier from the network boot management module; and
presenting the network interface having the unique identifier to the basic input/output system.

8. A method comprising:
receiving at a management controller of an information handling system a request for network boot of the information handling system from a remote target communicatively coupled to a network interface of a host system comprising the network interface and a host system processor communicatively coupled to the network interface and the management controller, wherein the request for network boot is received while the host system is booted into an operating system;
configuring the network interface for network boot via the network interface, including communicating, via a sideband interface of the management controller, a request to the network interface to enable the network interface for a network boot process; and
issuing an instruction to reboot the host system; wherein receipt of the request for network boot, configuration of the network interface for network boot, and issuance of the instruction to reboot the host system are performed without an intervening boot of the host system.

9. The method of claim 8, further comprising booting the host system from the remote target via the network interface responsive to receipt of the instruction to reboot the host system.

10. The method of claim 8, wherein receiving the request for network boot of the information handling system comprises receiving the request via a second network interface integral to the management controller and having a communications interface physically isolated from the network interface.

11. The method of claim 8, wherein configuring the network interface for network boot via the network interface comprises:
processing a unique identifier of the request for network boot of the information handling system; and
responsive to processing the unique identifier, determining capability of the network interface for the network boot process and communicating the request to the network interface to enable the network interface for the network boot process.

12. The method of claim 8, wherein the sideband interface is a Network Controller Sideband Interface (NCSI).

13. The method of claim 8, wherein the network boot process comprises one of Windows Pre-boot Execution Environment and network boot via Small Computer System Interface.

14. The method of claim 8, further comprising executing a network boot management module by the host system that, responsive to the instruction to reboot the host system, presents the network interface to a boot manager of a basic input/output system of the host system.

15. The method of claim 14, wherein the network boot management module is configured to present the network interface to the boot manager by, during boot of the host system:
communicating a query to the network boot management module to determine a unique identifier;
receiving the unique identifier from the network boot management module; and
presenting the network interface having the unique identifier to the basic input/output system.

16. An article of manufacture comprising:
a non-transitory computer-readable medium; and
computer-executable instructions carried on the computer-readable medium, the instructions readable by a processor, the instructions, when read and executed, for causing the processor to:
receive at a management controller of an information handling system a request for network boot of the information handling system from a remote target communicatively coupled to a network interface of a host system comprising the network interface and a host system processor communicatively coupled to the network interface and the management controller, wherein the request for network boot is received while the host system is booted into an operating system;
configure the network interface for network boot via the network interface including communicating, via a sideband interface of the management controller, a request to the network interface to enable the network interface for a network boot process; and
issue an instruction to reboot the host system, wherein receipt of the request for network boot, configuration of the network interface for network boot, and issuance of the instruction to reboot the host system are performed without an intervening boot of the host system;
wherein the host system is configured to boot from the remote target via the network interface responsive to receipt of the instruction to reboot the host system.

17. The article of claim 16, wherein receiving the request for network boot of the information handling system comprises receiving the request via a second network interface integral to the management controller and having a communications interface physically isolated from the network interface.

18. The article of claim 16, wherein configuring the network interface for network boot via the network interface comprises:
processing a unique identifier of the request for network boot of the information handling system; and
responsive to processing the unique identifier, determining capability of the network interface for the network boot process and communicating the request to the network interface to enable the network interface for the network boot process.

19. The article of claim 16, wherein the sideband interface is a Network Controller Sideband Interface (NCSI).

20. The article of claim 16, wherein the network boot process comprises one of Windows Pre-boot Execution Environment and network boot via Small Computer System Interface.

* * * * *